US005952969A

United States Patent [19]
Hagerman et al.

[11] Patent Number: 5,952,969
[45] Date of Patent: Sep. 14, 1999

[54] METHOD AND SYSTEM FOR DETERMINING THE POSITION OF MOBILE RADIO TERMINALS

[75] Inventors: Bo Hagerman, Stockholm; Sara Mazur, Bromma; Walter Ghisler, Upplands Väsby, all of Sweden

[73] Assignee: Telefonaktiebolaget L M Ericsson (publ), Sweden

[21] Appl. No.: 08/917,577

[22] Filed: Aug. 18, 1997

[51] Int. Cl.[6] .................................................. G01S 3/02
[52] U.S. Cl. ......................... 342/457; 342/463; 342/465
[58] Field of Search .................................. 342/357, 457, 342/465, 450, 463

[56] References Cited

U.S. PATENT DOCUMENTS

| | | | |
|---|---|---|---|
| 5,317,323 | 5/1994 | Kennedy et al. | 342/457 |
| 5,327,144 | 7/1994 | Stilp et al. | 342/387 |
| 5,613,205 | 3/1997 | Dufour | 455/33.2 |
| 5,615,409 | 3/1997 | Forssén et al. | 455/33.1 |
| 5,685,274 | 11/1997 | Rose | 342/417 |
| 5,708,443 | 1/1998 | Rose | 342/442 |

FOREIGN PATENT DOCUMENTS

| | | | |
|---|---|---|---|
| 0631453 | 12/1974 | European Pat. Off. | H04Q 7/04 |
| 4409178 | 9/1995 | United Kingdom | G01S 5/06 |
| 9205672 | 4/1992 | WIPO | H04Q 7/04 |
| 9312590 | 6/1993 | WIPO | H04B 7/26 |
| 9600486 | 1/1996 | WIPO | H04Q 7/38 |
| 9625830 | 8/1996 | WIPO | H04Q 7/38 |
| 9714257 | 4/1997 | WIPO | H04Q 7/22 |
| 9730360 | 8/1997 | WIPO | G01S 5/14 |

OTHER PUBLICATIONS

Ulf Forssén et al., "Adaptive Antenna Arrays for GSM900/DCS1800," Proceedings of IEEE Vehicular Technology Conference, pp. 605–609 (Mar. 1994).

T.S. Rappaport et al., "Position Location Using Wireless Communications on Highways of the Future," IEEE Communications Magazine, pp. 33–41 (Oct. 1996).

Primary Examiner—Thomas H. Tarcza
Assistant Examiner—Dao L. Phan
Attorney, Agent, or Firm—Jenkens & Gilchrist, P.C.

[57] ABSTRACT

The disclosure describes a novel Time Difference of Arrival (TDOA) method and system for determining the position of a mobile radio terminal within an associated mobile radio system, which is based on Time of Arrival (TOA) measurements, including a plurality of radio base stations, measuring devices, network controller, and service node. The measuring devices are synchronized in otherwise unsynchronized radio base stations. The measuring devices measure TOA on demand and (optionally) Direction of Arrival (DOA), on a digital uplink time slot or on digital information on an analog uplink traffic channel in one or more radio base stations. The TOA and DOA information and the traffic channel number are reported to a Mobile Services Switching Center, which obtains the mobile terminal's identity from the traffic channel number and sends the terminal identity and TOA and DOA measurement information to a Service Node. The Service Node calculates the position of the mobile radio terminal using the TOA information (supplemented by the DOA information when available).

26 Claims, 4 Drawing Sheets

BIT SYNC = 1010...101
W.S. = 11100010010

REVERSE VOICE CHANNEL MESSAGE STREAM (Mobile-to-Land)

METHOD AND SYSTEM FOR DETERMINING THE POSITION OF MOBILE RADIO TERMINALS

BACKGROUND OF THE INVENTION

1. Technical Field of the Invention

The present invention relates in general to the mobile radio communications field and, in particular, to a method and system for use in determining the geographical position of a mobile radio terminal.

2. Description of Related Art

Mobile radio position determination is an emerging field that has gained a great deal of interest lately, and it is now desirable to include a position determination capability in future cellular mobile radio systems. The Time Difference of Arrival (TDOA) position determination method, which is known from military applications, has been used successfully for determining the position of mobile radio terminals. A typical TDOA position determination system can be either terminal based, whereby the Time Of Arrival (TOA) measurements are made on the "downlink" in the mobile station (MS), or network based, whereby the network performs the TOA measurements on the "uplink" in the radio base stations (BSs). These TOA measurements are then used to calculate TDOA parameters and estimate the MS's position.

One position determination system, which has been used for cellular mobile radio position determination, is marketed by TruePosition™. This system has been used for determining the position of standard analog mobile radio terminals which operate in accordance with the IS-54 standard. Currently, these terminals constitute the vast majority of mobile radio terminals being used in the United States. The TruePosition system, with its own listening radio base stations, is operated independently of cellular systems and can serve wireline ("A" frequency band) and non-wireline ("B" frequency band) operators within the same geographical area. As such, these operators can share the same TruePosition position determination system. Upon request, the TruePosition system provides position information of individual cellular mobile radio terminals. Otherwise, the position determination system normally does not communicate with the cellular mobile radio systems.

As mentioned earlier, the TDOA method of position determination used by the TruePosition system is based on a known military application. Essentially, with the TDOA method, the absolute TOAs of an uplink message transmitted by a mobile radio terminal are registered in at least three fixed radio BSs. This information is processed in a centrally located processor, which calculates the position of the terminal. The registration of uplink messages in the TruePosition system is directed primarily to uplink control messages on the (analog) access channels (i.e., "reverse control channels" under the IS-54 standard). Notably, under the IS-54 standard, some of these control messages (e.g., registering messages and page response messages) contain the terminal identity in unencrypted code, which enables the TruePosition system to determine the position of a specific terminal without having to obtain any information from the cellular network operator responsible for the terminal concerned. The IS-54 standard further eases the positioning task by having all of the access channels assigned to a few, fairly narrow frequency bands, rather than having them dispersed over a wide frequency band among the traffic channels (e.g., as is the case for the IS-136 standard).

However, the primary use of access channels means that position determination is more easily performed for mobile radio terminals in an idle mode, because the access channels are used only by idle terminals (e.g. when registering or after being paged). If the position of a mobile terminal is to be determined while it is in a conversation mode, the TruePosition system has the option of utilizing a few traffic channels for voice channel tracking. Consequently, for example, if a police person's position is to be determined during an action while talking over a handheld radiophone, the network is required to hand-off or originally assign the radiophone to a traffic channel being monitored by the TruePosition system.

U.S. Pat. No. 5,327,144 to Stilp, et al. discloses a TDOA cellular telephone location system (apparently associated with the TruePosition system). According to this patent, the uplink signals transmitted periodically (e.g. cellular registering messages which can occur every 15 minutes under the IS-54 protocol) by a mobile radio terminal on a reverse (analog) control channel are received and recorded by at least 3 radio base stations. The TOA of each signal is recorded at the respective radio base station together with the identity of the transmitting terminal (contained in the uplink message). This information is transferred to a processor, which uses the TDOAs resulting from the three TOAs and the known locations of the radio base stations to calculate the position of the so-identified mobile radio terminal.

PCT Application No. WO 94/27161 to Stilp et al. (also apparently associated with the TruePosition system) discloses a TDOA system for determining the position of a mobile transmitter. The uplink signals transmitted responsively rather than periodically (e.g., cellular page-acknowledgment messages) by a mobile radio terminal are received, time-stamped with the TOA, and recorded by a plurality of BSs together with the identity of the transmitting terminal (contained in the uplink message). This information is transferred to a processor, which uses the TOAs and known locations of the radio BSs to calculate the position of the so-identified mobile radio terminal.

Although the above-described documents illustrate considerable progress in the cellular position determination field, there are still a number of problems left to be resolved. For example, the above-described TDOA method is generally not applicable to analog voice channels in an IS-54 system, because the voice channel frequencies are distributed to the radio BSs according to a frequency plan. If predetermined voice channels (frequencies) are to be used for position determination measurements instead of predetermined access channels, some radio BSs will be unable to assign voice channels on these predetermined frequencies because the BSs' combiners are tuned to base station-specific frequencies that may not include the predetermined frequencies. Consequently, the position of the terminals communicating with these radio BSs cannot be determined by the above-described method when those terminals are operating in the conversation mode.

An additional problem with the above-described positioning method in particular, when applied to a mobile radio terminal in the conversation mode on a traffic channel, relates to the power control of the mobile radio terminal. If the mobile terminal is near the serving radio base station, the land system will send power control orders to the mobile radio terminal requesting low uplink transmission power. More distant radio base stations ordered to measure TOA then will not receive a strong enough signal to perform the TOA measurements and read the terminal identity, if the distance from the mobile radio terminal is such that interference exceeds a certain limit.

Yet another problem with the above-described mobile terminal positioning method is that it is not applicable for digital voice channels in an IS-54 system, and the mobile terminal has to be handed over to one channel among a plurality of predetermined analog voice channels before the positioning method can be used. Furthermore, the above-described positioning method is difficult to apply under purely digital standards, such as in an IS-136 system (among others), because the control channels can be at any frequencies in the assigned frequency band, and it is impossible to record all traffic on all channels in advance before a position determination request has been received. Moreover, in some cellular mobile radio systems such as the digital Global System for Mobile communications (GSM), a frequency-hopping mode is used for traffic channels, which makes it virtually impossible to determine a mobile terminal's position according to the above-described method.

In conclusion, a need exists for a method of determining the position of any cellular mobile radio terminal on any uplink traffic channel or control channel and in accordance with any present and future mobile communication standards.

SUMMARY OF THE INVENTION

One problem addressed by the present invention is how to determine the geographical position of any digital or analog mobile radio terminal while applying an uplink TDOA method to ordinary digital and analog traffic channels (e.g., voice channels), but recognizing that mobile terminals operating in a conversation mode on traffic channels normally do not transmit their identities on the uplink, and that the traffic channels may be utilized in a frequency-hopping mode.

Another problem addressed by the present invention is how to determine the geographical position of standard digital and analog mobile radio terminals when directional antennas (e.g., antenna arrays) are available for use in the radio BSs, and thus how to supplement the uplink TDOA method with direction of arrival (DOA) measurements.

Still another problem addressed by the present invention is how to determine the geographical position of mobile radio terminals operating in a conversation mode using TDMA time slots on a carrier frequency, wherein "bursts" in the time slots can overlap with those in other time slots upon arriving at non-serving radio BSs, because the time alignment (TA) system function is designed to avoid such overlaps only at the serving radio BS.

Still another problem addressed by the present invention is how to improve the accuracy of measurements in certain geographical locations that require enhanced position determination of a mobile radio terminal. For example, the requirement for accuracy may vary depending on the environment (rural outdoors, urban indoors, etc.) of the mobile terminal needing the position determination.

Still another problem addressed by the present invention is how to enable radio base stations, as far as received radio energy is concerned, to measure the TOA of uplink signals transmitted from distant mobile radio stations.

Therefore, it is an object of the present invention to provide an uplink TDOA method and apparatus for determining the position of a mobile radio terminal operating in the conversation mode directly on an arbitrary analog or digital traffic channel of a mobile radio system, wherein non-frequency-hopping traffic channels are present and frequency-hopping traffic channels may be present.

It is another object of the present invention to provide an uplink TDOA method and apparatus for determining the position of a mobile radio terminal operating in the conversation mode directly on an arbitrary analog or digital traffic channel of a mobile radio system, wherein direction measurements are made in the fixed part of the system to supplement the TDOA measurements.

It is yet another object of the present invention to provide an uplink TDOA method and apparatus for determining the position of a mobile radio terminal operating in the conversation mode directly on an arbitrary analog or digital traffic channel of a mobile radio system, wherein the overlapping of received bursts can be avoided.

It is still a further object of the present invention to provide an uplink TDOA method and apparatus for determining the position of a mobile radio terminal operating in the conversation mode directly on an arbitrary analog or digital traffic channel of a mobile radio system, wherein locally enhanced accuracy can be provided as needed.

It is still another object of the present invention to provide an uplink TDOA method and apparatus for determining the position of a mobile radio terminal operating in the conversation mode directly on an arbitrary analog or digital traffic channel of a mobile radio system, wherein base stations (including the case where distant radio base stations are taking part in the position determination) are provided with enough received uplink signal energy to determine the TOA of the signals.

In accordance with the present invention, the foregoing and other objects are met by integrating the positioning functions in the land network of the mobile radio system that handles the mobile radio terminal. In particular, the uplink TOA (and optionally DOA) measurements needed for mobile terminal position determinations are performed on demand in the radio BSs of the mobile radio system using a modified Receiver (ModRX) in which the usual functions of a Transmitter-Receiver (TX-RX) have been supplemented by the functions of measuring equipment. In the preferred embodiment, the TX part is not used in the ModRX and therefore may be excluded. Measurement orders are sent by a network controller, such as, for example, a Mobile Services Switching Center (MSC) to one or more BSs, and the orders identify the radio channel on which to make the measurements. The measurements are made and reported back to the network controller, and from there (together with the identity of the mobile terminal associated with the radio channel at that particular time) to a processor in a Service Node (SN) that calculates the position of the mobile radio terminal.

In one embodiment of the present invention, the ModRX module in a cellular mobile radio system operating in accordance with the IS-136 standard, is ordered by the MSC to measure the TOA of signals on a specified uplink traffic channel, using a channel number (corresponding to an associated frequency and timeslot-specific sync-word) for traffic channel identification. When this measurement activity is completed, the ModRX transmits its TOA measurements back to the network controller (MSC) together with the traffic channel number (CHN). The network controller uses a look up table to translate the CHN to the identity (MS-ID) of the mobile terminal operating on the traffic channel at that time. Previously, the MS-ID and CHN information had been copied from a call setup record available in the cellular system and entered into the look up table when the measurement was ordered. The TOA measurements, along with the associated mobile terminal identity provided by the network controller, are provided as input parameters to the position determination calculations, which are performed in the SN in the network making use of at least three simultaneous measurements performed on the same terminal in three different radio base stations. The ModRX is synchronized to the digital information on the traffic channel on which it makes the measurements, and the TOA measurements are made relative to an accurate time reference (e.g., provided by the satellite-based Global Positioning System, GPS, or some other known absolute time reference).

In a second embodiment of the present invention, the mobile terminal position determination method and apparatus described above is supplemented by a ModRX performing DOA measurements, which are reported the same way as the TOA measurements described above. The DOA measurements are provided as input parameters to the position determination algorithm in the SN. If both TOA and DOA measurements are available for use in the position determination algorithm, only one radio BS reporting measurements of a radio channel is needed to obtain an unambiguous position determination result (e.g. using the intersection of the TOA distance circle and the line indicating the DOA).

In a third embodiment of the present invention, in those circumstances where distant BSs have to be used for position determination measurements, the TOA measurements made in the ModRX are performed after first performing a handover, so that time slots on the same carrier and adjacent to the measured traffic channel time slot are unused by other mobile connections. As mentioned above, this enables the use of distant BSs for positioning in those cases where there are no nearby alternate BSs available, and the use of a distant BS without first performing a handover would have caused a disturbing burst overlap.

In a fourth embodiment of the present invention, the TOA measurements are made by a ModRX located remotely from, but still connected to, its radio BS. In accordance with this embodiment, the local position determination accuracy can be improved with low additional cost where required.

In a fifth embodiment of the present invention, the serving radio base station is very near to the mobile radio terminal (MS). Before ordering TOA measurements to be made by a ModRX in a distant BS, the mobile radio terminal (MS) is forced to increase its transmitting power. This increase can be achieved by having the network controller order the MS to transmit with higher power during measurements, or by handing the MS off to a more distant serving BS, which also results in higher transmission power from the MS.

In a sixth embodiment of the present invention, the ModRX of the radio BS measuring TOA does not receive enough signal energy to make a reliable measurement on a signal message. However, since no reading of variable information on the traffic channel is associated with the TOA measurements being made in accordance with the invention, more than one message is received, thus accumulating received energy of non-variable information (e.g., sync word, CDMA code pattern, etc.) over a longer integration time than one message, which improves the signal-to-noise ratio for the signal on which the TOA measurement is being made.

In a seventh embodiment of the present invention, the ModRX of the radio BS measuring TOA does not receive enough signal energy above the interference level to make a reliable measurement. Before ordering TOA measurements to be made by the ModRX in that distant BS, the mobile radio terminal (MS) is handed off to another traffic channel in the same serving BS (intra-BS handoff), wherein the new traffic channel is chosen to be less disturbed by interference in that distant BS performing TOA measurements.

One important technical advantage of the present invention is that the position determination method can be applied to any analog and digital systems, and circuit-switched and packet-switched traffic and control channels, provided that the mobile radio terminal involved conveys or can be caused to convey any uplink digital (or digitized) information, because the ModRX listens to digital information known in advance (e.g. a sync-word) on any specified uplink radio channel without needing to read any terminal identity information or other variable information on the channel.

Another important technical advantage of the present invention is that a number of popular mobile communications systems (e.g., the Ericsson CMS88 system) have modules that measure uplink signal strength in connection with "verification" before handover (i.e., checking uplink signal strength in the target BS), and the present inventive measurement module can be obtained by modifying such a measurement module whereby the procedures and signal protocols necessary for position determination are readily available from the handover functions.

Yet another important technical advantage of the present invention is that the present position determination method applies equally as well during a call as when the mobile terminal is in the idle mode, because (as mentioned above) a requirement is that the mobile terminal involved can send digital information uplink, and no variable information is read while the measurements are being performed. This total capability can be important for certain critical situations, such as, for example, during a police action.

Still another important technical advantage of the present invention is that it is possible to install measuring modules ModRX remotely from a radio BS and thereby improve the local accuracy of the position determination measurements, by having just the measuring modules available in numerous different locations without the need for numerous complete radio BSs.

A further important technical advantage of the present invention is that it is possible to make measurements on frequency-hopping channels, because information about the hopping sequences is readily available in the mobile radio land network.

Still another important technical advantage of the present invention is that it enables increasing the received signal energy in the radio BSs when needed, by integrating energy in the receiver over more than one message (made possible because the contents of the messages do not matter), by increasing the transmission power in the MS (made possible by integration of the position determining function in the cellular system), or by handing off the MS by an intra-BS handoff to a traffic channel that is less disturbed by interference in a BS performing TOA measurements (again made possible by integration of the position determining function in the cellular system).

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Essentially, the present invention provides an uplink TDOA method for mobile radio terminal position determination, which, in a preferred embodiment, is based on a further development of a verification procedure applied in conjunction with handoffs in Ericsson systems operating in accordance with the IS-54, IS-136 and Pacific Digital Cellular (PDC) standards. When a handoff request is sent to the MSC, the MSC orders a specific base station module in the target cell to perform the verification. In an Ericsson system, such a module is called a Location and Verification Module (LVM) under the IS-136 standard, and a Verification Receiver (VRX) under the PDC standard. The purpose of this function is to verify the presence of the mobile terminal in the target cell. The verification module tunes to and verifies the mobile terminal's presence on the old channel. The result of the verification is sent to the MSC.

In accordance with the present invention, the position determination uplink measurements carried out by the BSs may include temporal (e.g., TOA) and angular measurements. The TOA measurements constitute a preferred method of measurement. However, angular measurements may be used to supplement the TOA measurements, in particular if a BS is equipped with adaptive antennas (antenna arrays) which readily enable the estimation of the DOA of signals from a mobile terminal. The mobile terminal's position can be estimated from the TOA and/or DOA measurements performed in one BS. Alternatively, the TOA and DOA measurements of a plurality of BSs can be combined in order to estimate a mobile terminal's position.

Figure 1:
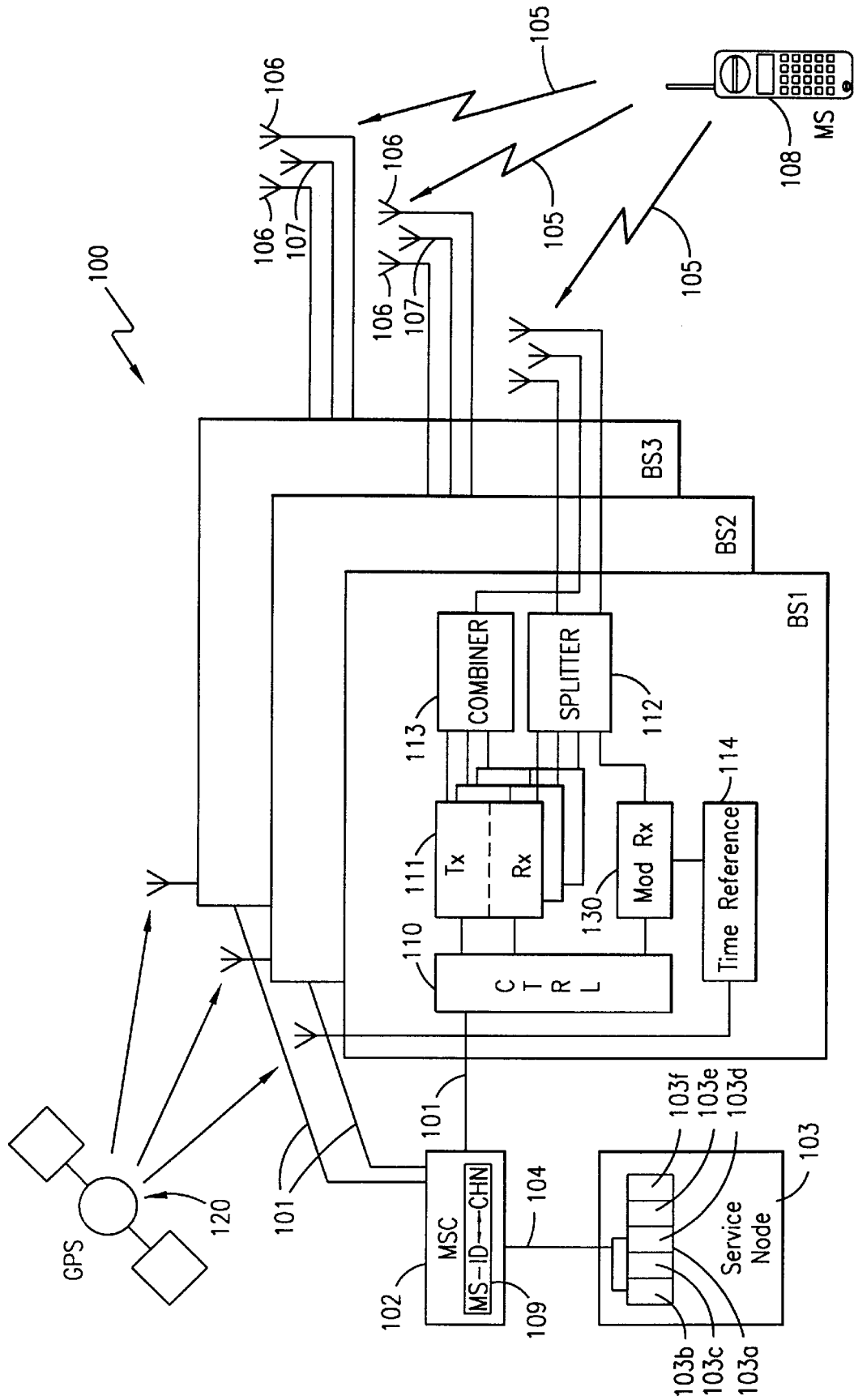
FIG. 1 is a schematic block diagram that shows a cellular mobile radio system with an integrated position determination function, in accordance with a preferred embodiment of the present invention.

FIG. 1 is a schematic block diagram that shows a cellular mobile radio system 100 with an integrated position determination function, in accordance with a preferred embodiment of the present invention. System 100 includes a plurality of radio BSs (an exemplary three are shown as BS1, BS2, BS3). The radio base stations are located at different sites and connected to a wire-bound network via communication links 101. The wire-bound network can include, for example, an MSC 102 connected in turn via a Public Switched Telephone Network or PSTN (not explicitly shown) to an SN 103. The connection 104 preferably comprises trunk connections. The MSC 102 includes a look up table 109 for associating channel numbers (CHNs) with mobile terminal identities (MS-IDs).

The SN 103 includes a processor 103a, which further includes a receiving unit 103b, storing unit 103c, sending unit 103d, and respective first and second calculating units (103e, 103f). The first calculating unit 103e calculates the TDOA of the signals received on the uplink by the radio base stations, wherein the first calculating unit 103e uses reported TOAs. The second calculating unit 103f calculates the position of mobile radio terminals using the TDOA information and (optionally) any reported DOA information available. The storing unit 103c maintains the known geographical locations of the radio base stations. The receiving unit 103b and sending unit 103d provide two-way communications with customers that request/receive position determination information (e.g., using short text messages such as the known Short Message Service messages).

FIG. 1 also shows a mobile radio terminal (MS) 108 whose position is to be determined. The radio base stations BS1, BS2 and BS3 "listen" to the traffic channel of the MS 108 via uplink radio connections 105 received over the two receiving antennas 106 of each such BS. This two-antenna capability provides space diversity for the radio traffic and also for the position determination measurements being made in accordance with the present invention. Each radio base station (BS1, BS2, BS3) includes a control section 110, and a plurality of TXRXs 111 connected to the receiving antennas 106 via a splitter 112, and the transmitting antenna 107 via a combiner 113. Moreover, each such BS includes a time reference unit 114 that receives signals preferably from an accurate time reference, such as, for example, the space-based GPS 120. The time reference signal is coupled continuously from the time reference unit 114 to the ModRX module 130.

The BS of the present invention (e.g., BS1) includes a time reference unit 114 and control section 110, which is capable of serving more units in the BS than just the ModRX. Preferably, the ModRX 130 is located in a BS, but such a ModRX can also be a free-standing unit located remotely from the BS but connected to the control section 110 and time reference unit 114 of the BS. If a ModRX is located in a BS, the ModRx can share the BS's receiving antennas 106. However, if the ModRX is located remotely from the BS, the ModRX can include its own receiving antennas 106.

Figure 2:
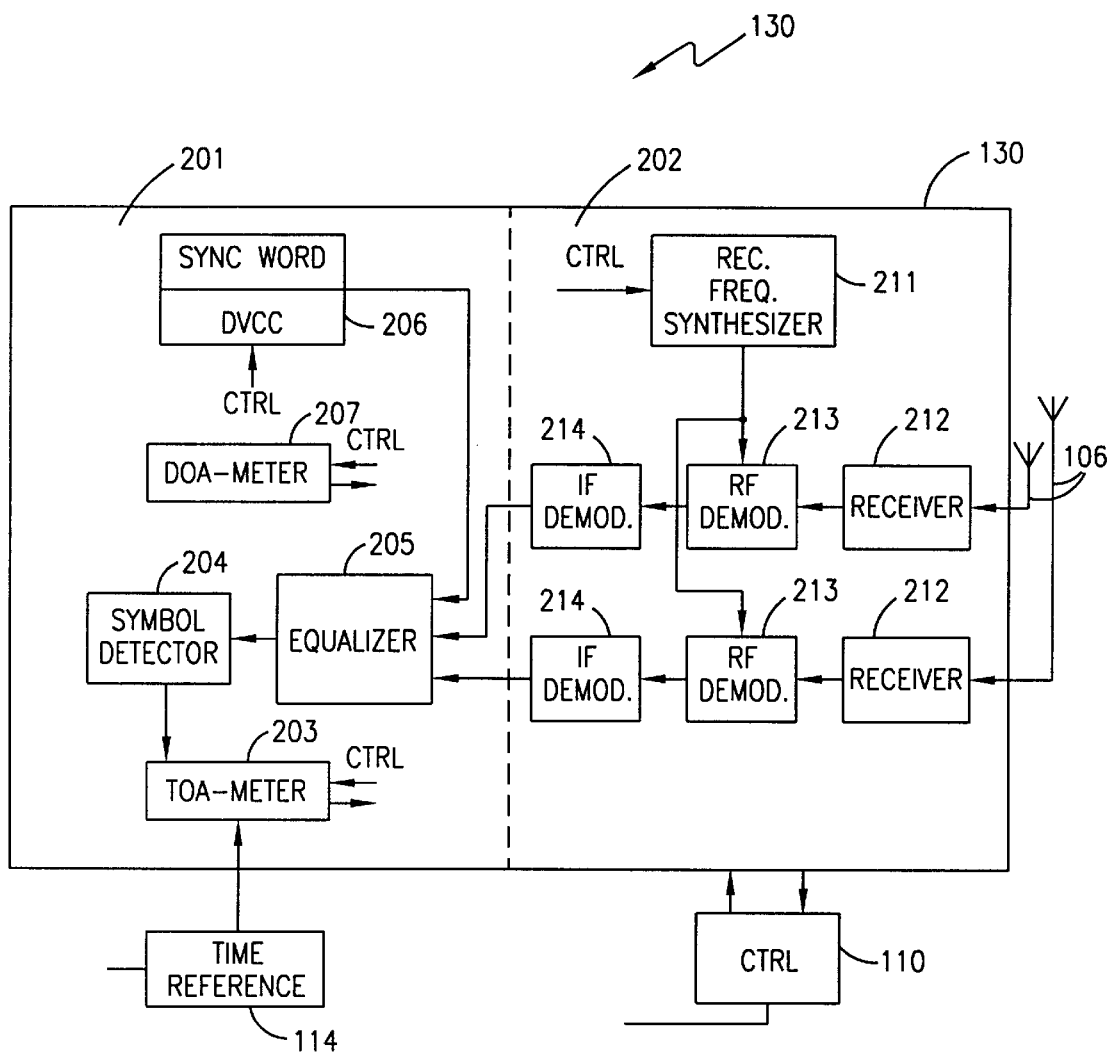
FIG. 2 is a schematic block diagram that shows details of the modified receiver (ModRX) 130 shown in FIG. 1.

FIG. 2 is a schematic block diagram that shows details of the ModRX 130 shown in FIG. 1. In the preferred embodiment, the ModRX performs TOA measurements in a radio BS. In certain BSs, the ModRX can also include known DOA measurement equipment 207 to supplement the TOA measurements.

ModRX 130 comprises a metering section 201 and radio receiver section 202. The metering section 201 may be triplicated (not explicitly shown in FIG. 2) for use in IS-54 and IS-136 systems, in order to handle the three full-rate time slots of a frame. Conversely, the radio receiver section 202 can be shared by the triplicated metering sections 201. If the ModRX 130 comprises a version used in a frequency-hopping system (e.g., GSM), the control section 110 preferably inputs the frequency-hopping sequences into the receiving frequency synthesizer 211, which enables position determinations to be made on frequency-hopping traffic channels. The radio receiver section 202 also includes receivers 212, RF demodulators 213, and IF demodulators 214 coupled to the two receiving antennas 106. More details about the GSM are provided in the GSM technical specification standardized by the European Telecommunication Standards Institute (ETSI), and the book entitled:"The GSM System for Mobile Communication," by Michel Mouly and Marie Bernadette Pautet (International Standard Book Number 2-9507190-0-7).

In FIG. 2, the metering section 201 includes a TOA-meter 203, which receives a time reference signal from time reference unit 114, and the uplink signal on which to make the TOA measurements from symbol detector 204. Symbol detector 204 receives the input signal from equalizer 205 (or a correlator, for analog channels). The sync-word and DVCC (Digital Verification Color Code) section 206 receives from control section 110 a number identifying the radio channel on which to measure the TOA. For example, in an IS-54 or IS-136 system, each BS in a cluster of BSs has a specific DVCC and seven different sync-words allowing it to synchronize on a particular time slot of a carrier frequency. This information is entered into the sync-word and DVCC section 206 from the control section 110, which in turn, receives the information from the MSC (102). The sync-word and DVCC section 206 couples this channel information to equalizer 205, in order to allow the equalizer to find the time slot (preferably using known correlation methods). Optionally, if the associated radio BS includes an array antenna system (corresponding to more than two antennas 106), the metering section 201 can include a DOA meter 207 connected only to control section 110. DOA meter 207 requests and receives from control section 110 the direction information available from the known beam-forming function in such a radio BS. Consequently, the DOA meter 207 is only relaying available information regarding the channel specified for position determination. When available, the DOA information can be utilized in the position determination algorithm in the SN to improve position determination accuracy, or enable position determinations to be made with less than three BSs involved. For example, when only the TOA and DOA from a single radio base station are available, the position of a mobile terminal can be determined where the straight line provided by the DOA intersects with the circle provided by the TOA measurements (speed of light divided by the propagation time of the signal from the mobile terminal to the BS).

Figure 3:
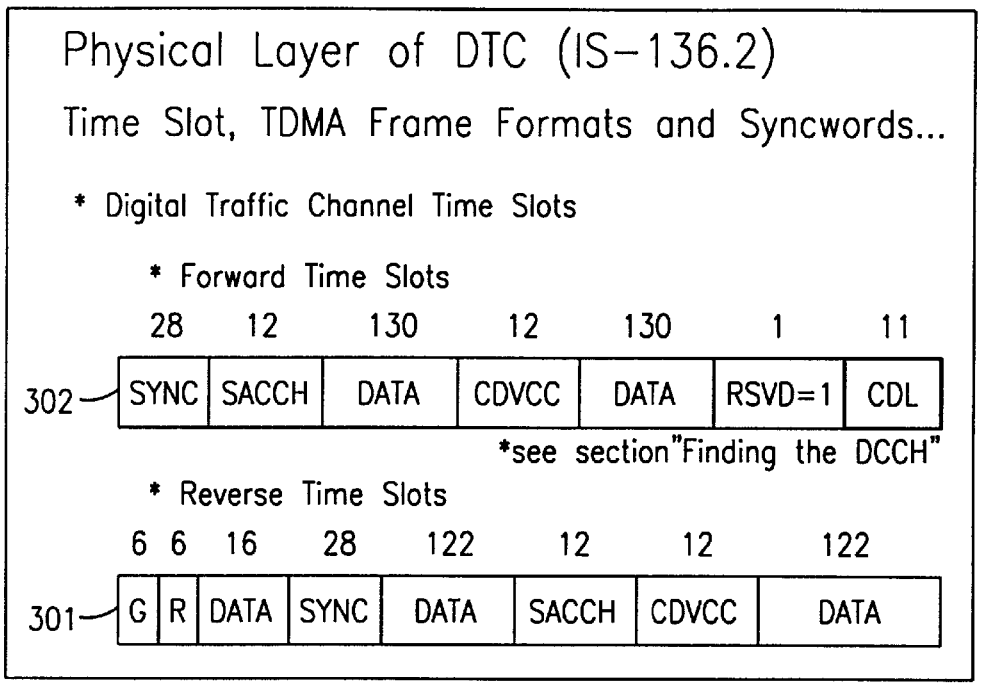
FIG. 3 is a diagram that illustrates a format for a reverse (uplink) time slot under the IS-136 standard on which TOA measurements are made, in accordance with the present invention.

FIG. 3 is a diagram that illustrates a format 301 for a reverse (uplink) time slot (under the IS-136 standard) on which TOA measurements are made, in accordance with the present invention. A forward (downlink) time slot format 302 is also shown, in order to demonstrate the different placement of the 28-bit sync-word. For the uplink, the sync-word which is used by the receiving correlator circuitry (not explicitly shown) to find the time slot is placed away from the beginning or end of the time slot. The reason for this placement is that the uplink timing of successive time slots on a carrier frequency is provided by different mobile radio terminals using different time slots on the same carrier. Consequently, there is a risk that uplink time slots can overlap each other when they arrive at a radio base station from different mobile radio terminals. The more or less centralized placement of the sync-word minimizes the chances of such overlap. This problem does not exist for the downlink. Nevertheless, should such an overlap occur on the uplink, it is important to save at least the sync-word from being disturbed.

Figure 4:
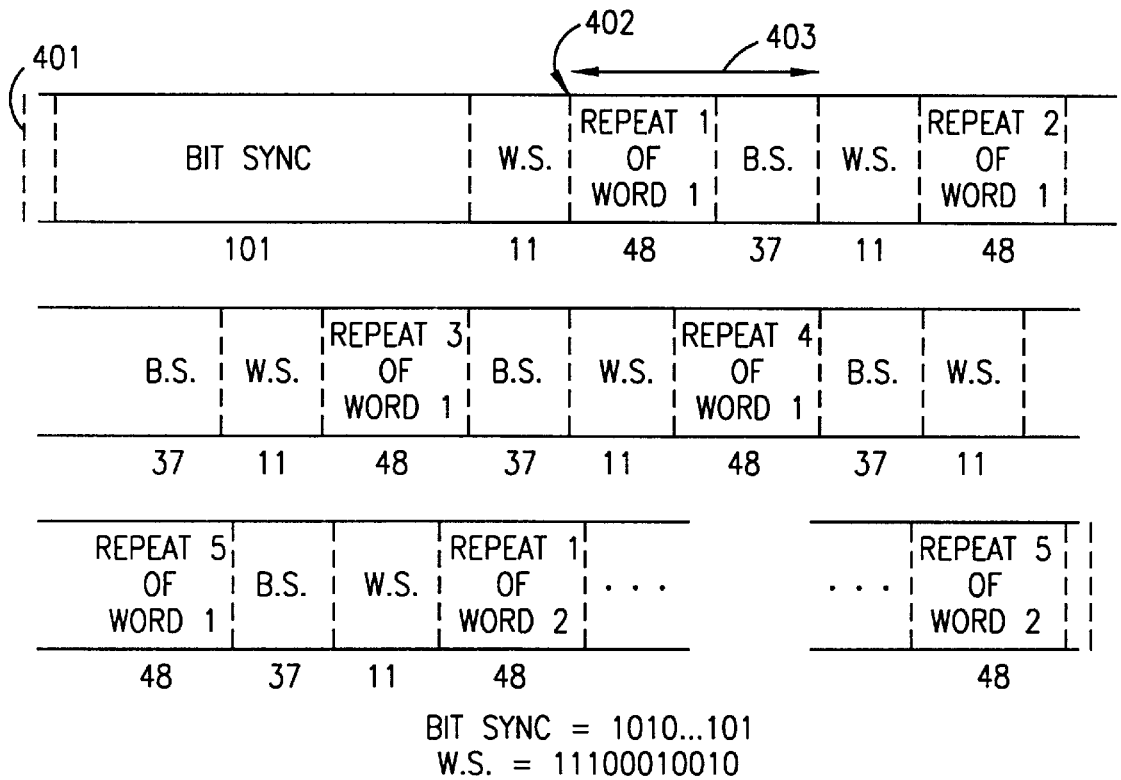
FIG. 4 is a diagram that illustrates a format for a reverse (uplink) voice channel message stream under the IS-54 standard on which TOA measurements are made, in accordance with the present invention.

FIG. 4 is a diagram that illustrates a format 401 for a reverse (uplink) voice channel message stream under the IS-54 standard on which TOA measurements are made, in accordance with the present invention. The absolute TOA may refer to any agreed point in a message (e.g., the end of the first word sync 402). The equalizer 205 can be assisted by time diversity to find the agreed point in a message, by looking at several word syncs in a message and correcting with the nominal delay 403 in time. For example, this capability is valuable when the agreed point 402 in a message is disturbed by fading. Analog voice channels do not contain a digital time reference and, therefore, it is necessary to cause the mobile terminal to send an uplink message on the voice channel (e.g., in response to an audit order on the downlink).

Figure 5:
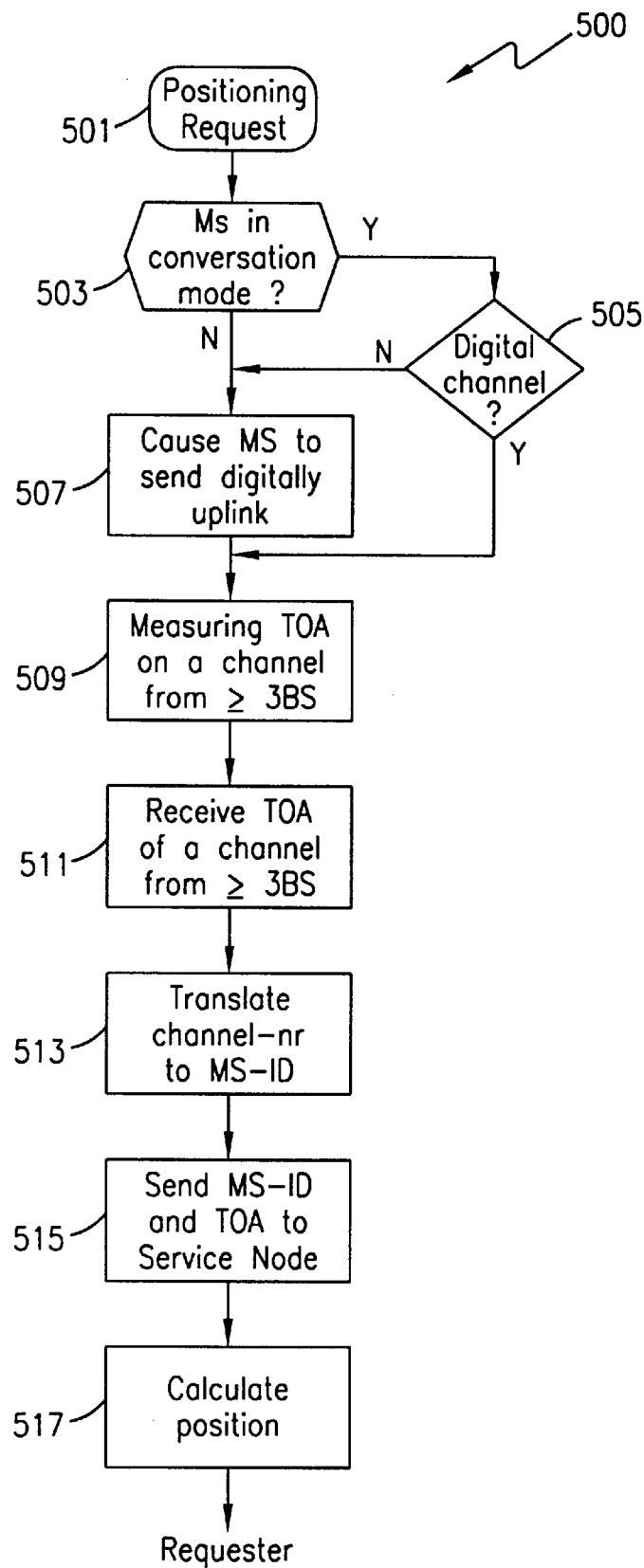
FIG. 5 is a flow chart that illustrates a position determination method that can be used in conjunction with the system shown in FIG. 1, in accordance with the present invention.

FIG. 5 is a flow chart that illustrates a position determination method 500 that can be used in conjunction with the system 100 shown in FIG. 1, in accordance with the present invention. Referring to FIGS. 1 and 5, when a position determination request comes in to the SN 103 (step 501), at step 503, a determination is made about whether the mobile terminal 108 to be positioned is in a conversation mode, by requesting MSC 102 via trunks 104 to set up a call to the mobile terminal. If the mobile terminal 108 is idle, the call is set up at step 507. If, at step 503, the mobile terminal is already in a conversation mode, at step 505, a determination is then made about whether the traffic channel being used is a digital traffic channel. If not (i.e., the traffic channel is analog), an audit message is sent from MSC 102 to the mobile terminal 108 in order for the mobile terminal to receive an uplink response in digital form (e.g., based on the format shown in FIG. 4). Otherwise, at step 505, if the traffic channel is digital, an audit message is not required. At step 509, the MSC 102 determines which (e.g., three) BSs are to take part in the position determination process and requests TOA measurements from at least three specified radio base stations, such as BS1, BS2 and BS3 via connections 101 and indicating the traffic channel number concerned. The control section 110 in each of the three BSs requests the ModRX 130 to determine the position of a mobile radio terminal on the specified channel. At step 511, the three BSs perform measurements in accordance with a known TOA measurement method and report the resulting measurement information to the MSC 102 together with the associated channel number (CHN). At step 513, the MSC 102 translates the CHN to a mobile radio terminal identity (MS-ID) making use of look up table 109 in the MSC. At step 515, the MSC sends the measurements from radio base stations BS1, BS2 and BS3 together with the MS-ID to the SN 103. At step 517, the SN 103 calculates the position of the mobile terminal 108, in accordance with a known triangulation algorithm. The resulting position information is conveyed to the position determination system customer who requested the position of the mobile terminal involved.

In a different embodiment of the present invention, a slight modification in the flow diagram of FIG. 5 can include a handoff step before performing the TOA measurements at step 509, in order to avoid overlaps of neighboring time slots and disturbance of the TOA measurements when distant radio BSs are participating in the position determinations.

In yet another embodiment of the present invention, another slight modification in the flow diagram of FIG. 5 can include a step for ordering more than one TOA measurement from a radio base station when that radio base station has a plurality (e.g., several) ModRXs connected to it, but those ModRXs are installed at different remote locations.

In still another embodiment of the present invention, another slight modification in the flow diagram of FIG. 5 can include substitution, at step 509, of the method "measure TOA and DOA on a channel from more than or equal one BS" instead of "measuring TOA on a channel from ≧3 BS" as shown, when there are BSs, which are capable of determining DOA, in the radio coverage of the MS. In that case, steps 511–517 will also include the handling of DOA measurements.

In still another embodiment of the present invention, another slight modification in the flow diagram of FIG. 5 can include steps for repeating the position determining steps 503–509 if, at step 509, it is determined that the uplink signal on the designated traffic channel is too weak to perform TOA measurements in some BSs. In this case, a step is added whereby the transmitting power of the MS is increased (or the signal-to-noise ratio is improved) before step 503 is repeated, either by performing an inter-BS handoff to a more distant serving BS, or by performing an intra-BS handoff to a traffic channel that is less disturbed by interference in a measuring BS, or preferably by directly ordering the MS to increase its transmitting power.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for determining the geographical position of a mobile radio terminal in a mobile radio system, said mobile radio system including a network controller and at least three radio base stations, each of said at least three radio base stations including an uplink TOA measuring unit operable to communicate with said network controller, a control unit, and a time reference unit operable to provide timing reference signals to said uplink TOA measuring unit, and a service node operable to store known positions of said at least three radio base stations, the method comprising the steps of:

receiving a request in said mobile radio system to determine the position of said mobile radio terminal;

if said mobile radio terminal is transmitting either analog signals or no signals, directing said mobile radio terminal to transmit digital signals uplink on a traffic channel;

measuring in said uplink TOA measuring unit an uplink TOA for said at least three radio base stations on said traffic channel;

receiving in said network controller said uplink TOA measurements from said at least three radio base stations and a reference to said traffic channel;

translating said reference to said traffic channel to an identity of said mobile radio terminal;

conveying said uplink TOA measurements and said mobile radio terminal identity to said service node; and calculating in said service node the position of said mobile radio terminal using said known positions of said at least three radio base stations and said uplink TOA measurements.

2. The method according to claim 1, further comprising the step of said network controller directing said mobile radio terminal to increase transmission power during said uplink TOA measurements.

3. The method according to claim 1, further comprising the step of inter-base station handing off said mobile radio terminal to a more distant serving base station.

4. The method according to claim 1, further comprising the step of intra-base station handing off said mobile radio terminal to a second traffic channel if, in a distant base station performing a TOA measurement, a signal-to-noise ratio of said traffic channel is less than a predetermined value, said second traffic channel having a signal-to-noise ratio greater than said predetermined value.

5. The method according to claim 1, wherein said uplink TOA measuring unit comprises a ModRX.

6. The method according to claim 1, wherein said directing step comprises setting up a call to said mobile radio terminal.

7. The method according to claim 1, wherein said directing step comprises activating said mobile radio terminal to transmit if said mobile radio terminal is a discontinuous transmission type and inactive.

8. The method according to claim 1, wherein said directing step comprises conveying information to an analog mobile radio terminal, said information directing said analog mobile radio terminal to respond uplink with digital information.

9. The method according to claim 1, wherein said directing step comprises conveying information to a packet terminal, said information directing said packet terminal to respond uplink.

10. A network controller for determining a position of a mobile radio terminal, comprising:

means for directing said mobile radio terminal to transmit digital signals uplink on a traffic channel if said mobile radio terminal is transmitting either analog signals or no signals;

means for directing at least one radio base station to perform TOA measurements on said traffic channel;

means for translating a channel identity to an identity of said mobile radio terminal; and means for conveying said TOA measurements and said identity of said mobile radio terminal to a service node for use in calculating said position of said mobile radio terminal.

11. A service node for use in calculating mobile terminal position information in a cellular mobile radio network, comprising:

means for receiving position information requests;

means for requesting a mobile radio terminal to transmit digital signals uplink on a traffic channel if said mobile radio terminal is transmitting either analog signals or no signals;

means for storing known radio base station position information for use in said calculating said mobile terminal position information; and means for calculating said mobile terminal position information using TOA information associated with said mobile terminal, and said known radio base station position information.

12. A mobile radio system capable of determining the geographical position of a mobile radio terminal located in said mobile radio system, comprising:

a network controller;

at least three radio base stations, each of said at least three radio base stations including uplink TOA measuring equipment operable to communicate with said network controller, and a time reference unit operable to provide timing signals to said uplink TOA measuring equipment; and a service node operable to store known position information about said at least three radio base stations, said mobile radio system operable to determine said geographical position of said mobile radio terminal, by receiving a request to determine said geographical position of said mobile radio terminal, directing said mobile radio terminal to transmit digital signals uplink on a traffic channel if said mobile radio terminal is transmitting analog signals or no signals, measuring TOA in the uplink TOA measuring equipment in at least three radio base stations uplink on said traffic channel, receiving from said at least three radio base stations said TOA measurement information in said network controller and a reference to said traffic channel, translating an identity of said traffic channel to an identity of said mobile radio terminal, conveying said uplink TOA measurement information and identity to said service node, and calculating in said service node the geographical position of said mobile radio terminal using said known position information of said at least three radio base stations and said uplink TOA measurement information.

13. The mobile radio system according to claim 12, wherein said directing operation comprises setting up a call to said mobile radio terminal.

14. The mobile radio system according to claim 12, wherein said directing operation comprises activating said mobile radio terminal to transmit if said mobile radio terminal is inactive and a discontinuous transmission type.

15. The mobile radio system according to claim 12, wherein said directing operation comprises conveying information to an analog mobile radio terminal that directs said mobile radio terminal to respond on said uplink with digital information.

16. The mobile radio system according to claim 12, wherein said directing operation comprises conveying information to a packet terminal that directs said packet terminal to respond on said uplink.

17. The mobile radio system according to claim 12, wherein said uplink TOA measuring equipment includes a DOA meter.

18. A measuring unit used in a mobile radio system for determining a TOA measurement of a mobile radio terminal, said measuring unit comprising:
   at least one radio receiver section further including:
      a receiver for receiving a digital uplink signal from said mobile radio terminal where said mobile radio terminal is directed to transmit the digital uplink signal on a traffic channel if the mobile radio terminal is transmitting either analog signals or no signals;
      a demodulator, coupled to said receiver, for demodulating the digital uplink signal; and
   at least one metering section, coupled to said at least one radio receiver section, further including:
      a sync-word section for receiving an identity of the traffic channel;
      an equalizer, coupled to said sync-word section, for using said identity of the traffic channel to receive the digital uplink signal;
      a symbol detector for receiving the digital uplink signal from said equalizer; and
      a TOA meter, coupled to said symbol detector, for receiving the digital uplink signal and making the TOA measurement of the mobile radio terminal using a time reference signal.

19. The measuring unit of claim 18, wherein said at least one radio receiver further includes a frequency synthesizer, coupled to said demodulator, for enabling position determination using said traffic channel configured as a frequency hopping traffic channel.

20. The measuring unit of claim 18, wherein said at least one metering section further includes a DOA meter.

21. The method according to claim 1, further comprising the step of performing a handover before measuring said uplink TOA measurements.

22. The mobile radio system according to claim 12, further comprising means for performing a handover before measuring said uplink TOA measurements.

23. A method for determining a geographical position of a mobile radio terminal in a mobile radio system, said mobile radio system including a network controller and a radio base station including a plurality of uplink TOA measuring units each located at a different location with respect to one another and each operable to communicate with said network controller, a control unit, and a time reference unit operable to provide timing reference signals to said plurality of uplink TOA measuring units, and a service node operable to store known positions of said plurality of uplink TOA measuring units, the method comprising the steps of:
   receiving a request in said mobile radio system to determine the position of said mobile radio terminal;
   if said mobile radio terminal is transmitting either analog signals or no signals, directing said mobile radio terminal to transmit digital signals uplink on a traffic channel;
   measuring in each uplink TOA measuring unit an uplink TOA measurement on said traffic channel;
   receiving in said network controller said uplink TOA measurement from each uplink TOA measuring unit and a reference to said traffic channel;
   translating said reference to said traffic channel to an identity of said mobile radio terminal;
   conveying said uplink TOA measurements and said mobile radio terminal identity to said service node; and
   calculating in said service node the position of said mobile radio terminal using said known positions of said plurality of uplink TOA measuring units and said uplink TOA measurements.

24. A mobile radio system capable of determining a geographical position of a mobile radio terminal located in said mobile radio system, comprising:
   a network controller;
   a radio base station including a plurality of uplink TOA measuring units each located at a different location with respect to one another and each operable to communicate with said network controller, and a time reference unit operable to provide timing signals to each uplink TOA measuring unit; and
   a service node operable to store known positions of said plurality of uplink TOA measuring units, said mobile radio system operable to determine said geographical position of said mobile radio terminal, by receiving a request to determine said geographical position of said mobile radio terminal, directing said mobile radio terminal to transmit digital signals uplink on a traffic channel if said mobile radio terminal is transmitting analog signals or no signals, measuring TOA information on said traffic channel in each uplink TOA measuring unit, receiving from each uplink TOA measuring unit said TOA measurement information in said network controller and a reference to said traffic channel, translating an identity of said traffic channel to an identity of said mobile radio terminal, conveying said uplink TOA measurement information and identity to said service node, and calculating in said service node the geographical position of said mobile radio terminal using said known position information of said plurality of uplink TOA measuring units and said uplink TOA measurement information.

25. A method for determining a geographical position of a mobile radio terminal in a mobile radio system, said mobile radio system including a network controller and a radio base station including an uplink measuring unit operable to communicate with said network controller, a control unit, and a time reference unit operable to provide timing reference signals to said uplink measuring unit, and a service node operable to store a known position of said radio base station, the method comprising the steps of:

receiving a request in said mobile radio system to determine the position of said mobile radio terminal;

if said mobile radio terminal is transmitting either analog signals or no signals, directing said mobile radio terminal to transmit digital signals uplink on a traffic channel;

measuring in said uplink measuring unit an uplink TOA measurement and a DOA measurement for said radio base station on said traffic channel;

receiving in said network controller said uplink TOA measurement and said DOA measurement from said radio base station and a reference to said traffic channel;

translating said reference to said traffic channel to an identity of said mobile radio terminal;

conveying said uplink TOA measurement, said DOA measurement and said mobile radio terminal identity to said service node; and calculating in said service node the position of said mobile radio terminal using said known position of said radio base station, said uplink TOA measurement and said DOA measurement.

26. A mobile radio system capable of determining a geographical position of a mobile radio terminal located in said mobile radio system, comprising:

a network controller;

a radio base station including an uplink measuring equipment operable to communicate with said network controller, and a time reference unit operable to provide timing signals to said uplink measuring equipment; and a service node operable to store known position information about said radio base station, said mobile radio system operable to determine said geographical position of said mobile radio terminal, by receiving a request to determine said geographical position of said mobile radio terminal, directing said mobile radio terminal to transmit digital signals uplink on a traffic channel if said mobile radio terminal is transmitting analog signals or no signals, measuring on said traffic channel a TOA measurement and a DOA measurement in the uplink measuring equipment, receiving from said radio base station said TOA measurement and said DOA measurement in said network controller and a reference to said traffic channel, translating an identity of said traffic channel to an identity of said mobile radio terminal, conveying said TOA measurement, said DOA measurement and the identity to said service node, and calculating in said service node the geographical position of said mobile radio terminal using said known position information of said radio base station, said TOA measurement, and said DOA measurement.

* * * * *

UNITED STATES PATENT AND TRADEMARK OFFICE
CERTIFICATE OF CORRECTION

PATENT NO. : 5,952,969
DATED : Sep. 14, 1999
INVENTOR(S) : Hagerman et al.

It is certified that error appears in the above-identified patent and that said Letters Patent is hereby corrected as shown below:

Title page,

Item [73]   Replace "Telefonakiebolaget"
            With --Telefonaktiebolaget--

Signed and Sealed this

Sixth Day of June, 2000

*Attest:*

*Attesting Officer*

Q. TODD DICKINSON
*Director of Patents and Trademarks*